United States Patent
Cummings

[11] Patent Number: 6,033,207
[45] Date of Patent: Mar. 7, 2000

[54] FLAMELESS COMBUSTION AND UTILIZATION OF FUEL GASES

[75] Inventor: Donald Ray Cummings, Ultimo, Australia

[73] Assignee: Isentropic Systems Ltd., Sydney, Australia

[21] Appl. No.: 08/845,661

[22] Filed: Apr. 25, 1997

Related U.S. Application Data

[63] Continuation of application No. PCT/AU95/00719, Oct. 27, 1995, abandoned.

[30] Foreign Application Priority Data

Oct. 27, 1994 [AU] Australia ................................. PM9049
Oct. 27, 1994 [AU] Australia ................................. PM9051

[51] Int. Cl.[7] ........................................................ F23R 3/28
[52] U.S. Cl. ............................................. 431/11; 431/215
[58] Field of Search ............................... 60/39.465, 736; 431/11, 215, 247, 248

[56] References Cited

U.S. PATENT DOCUMENTS

| | | | |
|---|---|---|---|
| 3,313,103 | 4/1967 | Johnson | 60/39.465 |
| 4,052,143 | 10/1977 | Sandviknes | 431/215 |
| 4,850,857 | 7/1989 | Obermuller | 431/248 |
| 5,326,537 | 7/1994 | Cleary | 422/173 |

FOREIGN PATENT DOCUMENTS

| | | |
|---|---|---|
| 28481/92 | 5/1993 | Australia . |
| 1125358 A1 | 10/1956 | France . |
| 165321 | 10/1991 | Poland . |
| 989054 | 4/1965 | United Kingdom . |
| 2107041 A1 | 4/1983 | United Kingdom . |

OTHER PUBLICATIONS

Examiner's Report dated Jul. 7, 1999 from Polish Patent Office (with translation).
Burke, *Coal Australia: Optimism Returns to the South Coast*, Australia's Mining Monthly, Dec. 1995–Jan. 1996, pp. 56–57.
*Coal Gas for Coal Trucks*, Australian Mining, vol. 82, No. 5, May 1990, pp. 32–33.
Derwent Abstract Accession No. 0018 K/01 class Q73, Q77, BE 894133 (Inst Rech Siderurgie) Dec. 16, 1982 (Abstract).
Patent Abstract of Japan, M430, p. 95, JP 60–129517, A (Hitachi Zosen KK) Jul. 10, 1985 (Abstract).
International Search Report for International Application PCT/AU 95/00719.

*Primary Examiner*—Louis J. Casaregola
*Attorney, Agent, or Firm*—Lyon & Lyon LLP

[57] ABSTRACT

A combustor for the combustion of fuel gas is described. The fuel gas entering the combustor by an inlet pipeline is a compressed admixture with air of a concentration below the lower explosive limit. The fuel gas/air admixture passes within a tube to pass to the combustion zone where combustion occurs only by reaction/self-combustion. The combusted gas passes by a tortuous path provided by an arrangement of baffles to the outlet duct. The exhausting combusted gas passes over the outer surface of the tube and gives up preheating heat to the inlet gas therein. A gas turbine system for utilizing waste fuel gas also is described that includes a combustor as described that provides combusted fuel to the expansion stage of the turbine.

10 Claims, 4 Drawing Sheets

FLAMELESS COMBUSTION AND UTILIZATION OF FUEL GASES

This application is a continuation of PCT/AU95/00719 with an international filing date of Oct. 27, 1995, now abandoned.

TECHNICAL FIELD

The present invention relates to the improved combustion and utilization of fuel gases. In one preferred embodiment, methods and apparatus are described that utilize gases from mines, landfills or the lie that have marginal energy value and otherwise are wasted.

In this specification, the term "fuel gas" is to be understood as embracing a combustible gas such as methane or methane-containing gases such as natural gas, coal seam gas, sewage gas, landfill gas and the like, and carbon monoxide-containing gases such as blast furnace gas, steel-making gases, producer gases and the like. These combustible gases also may contain impurities such as nitrogen, carbon dioxide and air. In some instances, such as for mine ventilation air, the gases may be substantially diluted, and the ratio of such combustible gas to air must be either below the lower explosive limit or above the upper explosive limit of the mixture. Furthermore, "fuel gas" can include a mixture of purposefully admixed air with the combustible gas.

In the context of "fuel gas" provided to a combustor embodying the present invention, the term is to be understood as being the case of a mixture of combustible gas(es) and air such that the mixture is below the lower explosive limit of that mixture.

BACKGROUND OF THE INVENTION

Many low quality fuels, such as blast furnace gas, and excessively diluted fuel gases such as methane-containing coal mine ventilation air, are flared or vented and thus not beneficially utilized due primarily to problems associated with the very high cost of established techniques and/or the non-availability of suitable techniques and low cost equipment enabling the fuel's commercial utilization. Very large volumes of these such fuel gases must be compressed to be utilised, and the mass flow rates through the compression and expansion stages of the gas turbine, and the associated combustion problems, are such that standard turbine designs cannot be used.

A further problem with the use of gas turbines to utilize diluted fuel gases is that substantially all of the gas must be compressed to above the combustion pressure of the turbine to be fed as fuel to the turbine, and this compression is costly both in equipment and power requirements.

In gas-prone underground coal mines, methane exaction may remove part of the total methane present in coal seams affected by underground mining as a methane fuel gas stream contaminated with air and other contaminants, such as carbon dioxide. The ratio of methane extracted by this technique is generally less than 50% of the total quantity of methane emitted during mining, with the greater part being emitted in the mine ventilation air. The methane content in ventilation air in these mines typically is between 0.8 and 1.0%. It has been proposed to utilize this otherwise wasted gas by ingestion in gas turbines as all or part of the air feed to the turbine, although it has been found that modem high efficiency and cost-effective gas turbines are generally not suited to this duty, as the required overall ratio of methane fuel to ingested air ratio for such turbines is generally in excess of 2% and normally closer to 3% by volume, hence even if the ingested methane in the methane-contaminated air could be burnt, and even with 1.0% by volume of methane in the air, only approximately one third of the turbine's fuel requirements would be provided. Such a turbine could not make effective use of the gas flows from such mines even if the combustion problems could be solved and mine drainage gas used as supplementary fuel.

With such dilute fuel gas steams, a further problem exists in that modern high efficiency turbines typically use in excess of 15% of the total air flow for cooling and purging purposes. Consequently a significant part of the methane in the ingested air by-passes the combustion stage, hence any fuel in that air can not be utilized and thus is wasted. In addition, it is known tat methane by-passing the combustion stage and being added to the combustion gas flow at intermediate temperatures can form active radicals such as methyl-hydroxyl radicals which promote the conversion of nitric oxides formed in the combustion stage to toxic and visible nitrogen dioxide.

Some low purity gases such as those from sewage treatment, "landfill" operations, coal seams and the like may contain high concentrations of carbon dioxide, up to and possibly in excess of 70% by volume. Such gases have the problem of being very difficult if not impossible to combust in conventional gas turbines and related combustion systems.

A paper entitled "The Elimination of Coal Mine Methane Emissions" in The Australian Institute of Energy's News Journal of June 1992, and authored by the present inventor, proposed to ingest methane containing coal mine ventilation air into a gas turbines, however this was proposed prior to full realization of the problems discussed above. At the time it was proposed that a water seal be used as a flame arresting and mine isolation device between the mine and the turbine combustion system, together with a special control valve for varying an amount of dilution air to ensure the intrinsic safety of operation of the turbine should the methane in the ventilation air exceed the pre-determined upper level of methane in ventilation air. This proposed system also had the problem of being relatively complex and the turbine would, without the safety control device, operate with a methane in air content of about 3% by volume, or higher if combustion was not complete. This would be unacceptably close to the lower explosive limit of methane in air.

A yet further problem exists, in that if a mixture of fuel gas in air is to be provided for ingestion in a gas turbine or supplied to a combustor, and the mixture is to be below the lower explosive limit, explosive mixtures will exist transiently at the point of mixing. For gas turbines and large industrial units, low pressure drops in the mixing stage are desirable, and the risk and magnitude of any possible explosion should be minimal despite the large volumes of air and fuel gas required for gas turbines and industrial furnaces.

Despite the benefits of utilizing the otherwise wasted gas, until now turbine manufacturers have not proposed a suitable turbine design.

More generally, Nitric Oxide (NOX) formation during the combustion of fuel gases is a general problem for a wide range of heating systems such as commercial and industrial combustors, furnaces, gas turbines and the like. In many applications, the desired temperature of the combustion gases formed by the combustion process is significantly less than the flame temperature of the gas burnt, however the level of NOX produced in the resultant gas is determined by the flame temperature and not the temperature of the final mixed gases. Typical of this problem is the combustion of fuel in gas turbines where the combustion gases are required at temperatures in the order of 850° C. to 1,200° C., but where NOX levels are determined by flame conditions in the combustor, even with very advanced designs for burners (such as rich burn followed by lean burn) which are expected to reduce NOX in exhaust gases to below 20 ppm, the possibility of reducing NOX emissions to below 10 ppm is generally thought to be achievable only with the use of very special combustion systems such as catalytic devices.

Catalytic combustion systems generally rely on the use of noble metal catalysts such as platinum and palladium which have the problem of being rare and expensive elements, and which are also easily poisoned by impurities in some fuel gases, one example being the presence of silanes in landfill gases.

A further combustion problem exists where mixtures of gaseous fuel and air exist and the level of fuel in the air is below the lower flammability of the mixture, hence cannot be combusted using currently available non-catalytic combustion technology without requiring the combustion of additional fuel to initiate and maintain combustion.

It is known to ingest hydrocarbon contaminated air in gas turbines to combust the contaminant and utilize it as part of the turbine fuel, but generally only where the content represents a minor portion of the fuel. This technique is used primarily to reduce the emissions of the contaminant, and cannot be readily used to supply a significant portion of the gas turbine's fuel requirements using conventional gas turbines due to limitations of conventional combustors.

It is a preferred objective of the present invention to overcome or at least ameliorate one or more of the foregoing problems in the prior art.

DISCLOSURE OF THE INVENTION

In accordance with a first aspect, there is disclosed a combustor for the combustion of fuel gases, the combustor comprising a vessel having an inlet for the supply of fuel gas, an array of hollow tubes having one end open to the supplied fuel gas and the other end open to a combustion zone, the tubes being spaced-apart so that the outside of the tubes forms an exit path for combusted gas from the combustion zone passing to an outlet from the vessel, the heat of the combusted gas being partially transferred to the inlet gas within the tubes to preheat the inlet gas, the ratio of the supplied fuel gas with air being less than the lower explosive limit for that fuel gas, and combustion in said combustion zone occurring by reaction or self-combustion of the preheated fuel gas.

The combustor can further comprise baffle means between the tubes to form a tortuous exit path. The tubes can be arranged longitudinally of the vessel and said inlet and said outlet being proximate the same end of the vessel and the combustion zone being at the other end of the vessel. The tubes can be arranged in a hexagonal array by said baffle means formed of hexagonal shaped sleeves fitting over said tubes and interlocking adjacent sleeves. Further there can be a burner located adjacent said combustion zone for preheating said combustion zone to the combustion temperature before the fuel gas is introduced to the combustor.

In accordance with another aspect, there is disclosed a method for combusting fuel gases comprising the steps of:
preheating supplied fuel gas by heat given up by previously combusted fuel gas;
containing said preheated fuel gas for a time sufficient for reaction or self-combustion to occur;
discharging said combusted fuel gas by a tortuous path to exchange heat with said supplied fuel gas.

Preferably, there is the further step of disposing a combustion area at a temperature sufficient to cause combustion of said preheated fuel gas on its supply.

In accordance with a flier aspect here is disclosed a gas turbine system for the utilization of fuel gas to produce useful energy, the system comprising:
a compression stage receiving said fuel gas and outputting compressed fuel gas;
a combustor receiving said compressed fuel gas, the fuel gas having a ratio to air of less than the lower explosive limit for that fuel gas, and preheating said compressed fuel gas by heat transfer from combusted fuel gas thereof before combustion of the preheated fuel gas, the combustion occurring by reaction or self-combustion; and
an expansion stage mechanically coupled to said compression stage, and receiving said combusted fuel gas, the energy of expansion being converted to useful rotational energy.

In a preferred form, the exhaust expanded gas from said expansion stage passes to a heat exchanger to give up heat to said compressed fuel gas before reaching said combustor. Furthermore, an electrical generator or an air compressor is coupled to said expansion stage to convert said rotational energy to electrical energy. The supplied fuel gas can be an admixture of coal mine drainage gas and ventilation air. The admixture can be formed by mixing stage comprising a duct for said mine ventilation air in the path of which is a plurality of tubes receiving said mine drainage gas, the tubes having a plurality of holes therein to allow said mine drainage gas to be inducted to mix with said mine ventilation air. Most advantageously, the fuel gas is methane bearing. The proportion of methane to air preferably is $\leq 2\%$.

The invention yet further discloses a gas turbine system as defined above incorporating a compressor as further defined above as the compressor stage.

The invention yet further discloses a method for utilizing fuel gas in a gas turbine to produce useful energy, the method comprising the steps of:
compressing fuel gas;
preheating said compressed fuel gas prior to combustion by heat given up by previously combusted fuel gas;
combusting said preheated fuel gas by reaction or self-combustion; and
expanding said combusted gas to produce useful energy.

Advantageously there is the further step of heating the compressed fuel gas by heat exchange from exhaust gas following the expansion stage.

DESCRIPTION OF THE DRAWINGS

FIG. 3b shows an array of the component tube of FIG. 3a;

BEST MODE OF PERFORMING THE INVENTION

Figure 1:
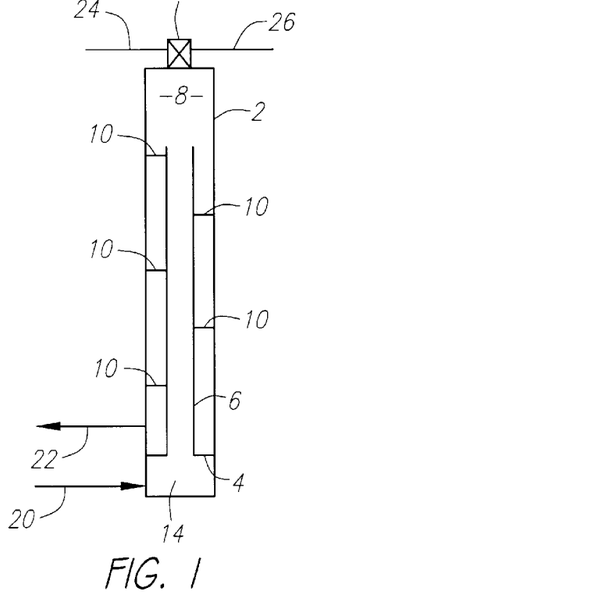
FIG. 1 is a cross-sectional side view of a combustion chamber embodying the invention.

An embodiment of the invention is now described in more detail with reference to FIG. 1 which shows a simplified form of combustion chamber 2.

Fuel gas (e.g. methane containing combustion air at a concentration level sufficient to place the mixture below its lower explosive level fed to the inlet header 14 of the combustion chamber 2 via a pipeline 20 to pass past a tubesheet 4 to the heat exchanger tube 6 where the gas is to be heated to its ignition temperature before entering the combustion zone 8. The elevated temperature, together with the volume of the high temperature combustion zone 8 provides the necessary residence time for the fuel gas to react and self-combust via free radical-induced combustion reactions. The combustion thus is spontaneous in nature, with the methane component gas being converted to carbon dioxide gas and water vapour. The obviation of the need to provide a flame for the combustion occur means that there will be very low production of NOX compounds, even as low as <5 ppm.

The hot gases leaving the combustion zone 8 pass over the external side of the heat exchanger tubes 6 with the gases being mixed and directed across the external surface tubes by a series of baffles 10 in a tortuous or circuitous path before exiting via duct 22, substantially combusted and at the desired temperature for provision to the expansion stage of a gas turbine.

The combustion chamber 2 is suitably lined with insulating material and has a heat resisting inner lining such as ceramic tiles and/or rings. Where the tube 6 is made of non-metallic material, such as silicon carbide, the tube is cemented into the metallic tubesheet 4 and the tubesheet 4 is suitably insulated against the high temperature combustion gases on the side corresponding to the exit duct 22.

The combustion chamber 2 is brought up to operating temperature by a burner 12 which is fed separately with fuel from a pipeline 24 and air from a separate pipeline 26, both of which can be derived from the same source of the fuel and air in supply pipeline 20. Once the operating temperature (for methane approximately >1000° C.) is achieved, the burner 12 is shut down and cooled by a continuing small flow of air only to the burner 12. The burner can also operate at low rating as a pilot burner.

Figure 2A:
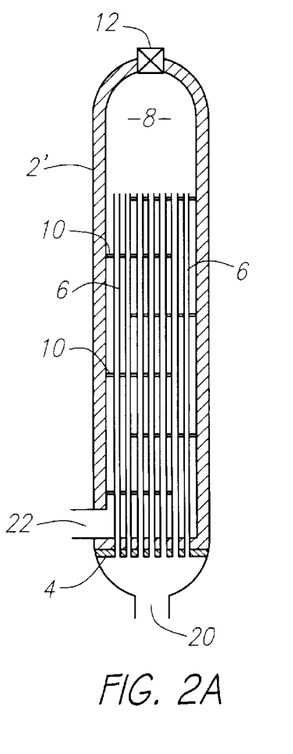
FIGS. 2a and 2b show further embodiments of the combustion chamber.
Figure 2B:
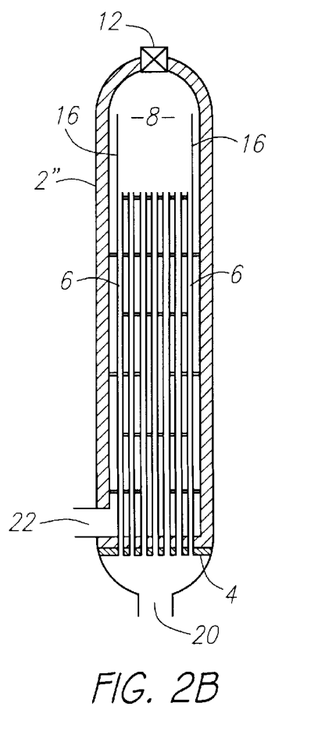

FIG. 2a shows a typical preferred arrangement for a combustor 2 based on the simplified combustor 2 described above. An array of heat exchanging tubes 6 are provided, the lower end of each of which is open to the supply pipeline 20. The baffles 10 are arranged for conventional cross-flow baffling. FIG. 2b shows a similar combustor 2" with extension plates 16 arranged to ensure continuous upward flow followed by segregated downward flow to the heat exchanger zone.

Figure 3A:
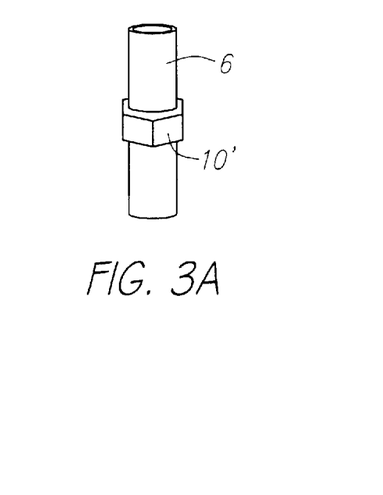
FIG. 3a shows detail of a component heat exchanging tube.
Figure 3B:
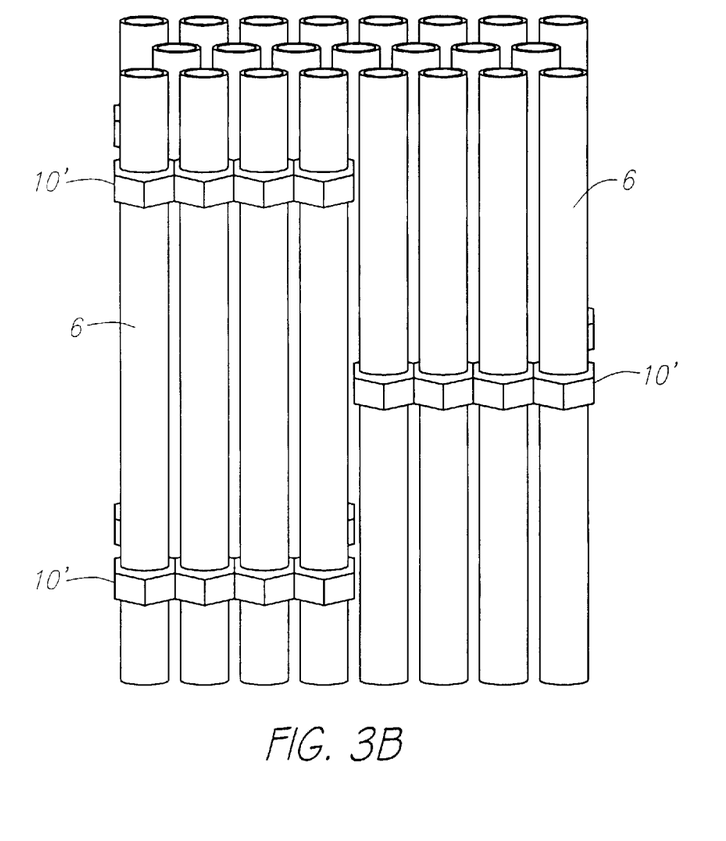

FIG. 3a shows a section of a silicon carbide tube having a hexagonal baffle section integral with the tube 6, while FIG. 3b shows the array of tubes 6 where the hexagonal baffle supports 10 are staggeredly arranged to form a tortuous path to the exit duct 22, ensuring effective heat exchange.

EXAMPLE

In one embodiment, the combustor 2" is used to fuel a turbine similar to a Centaur 3000R recuperated gas turbine with the combustor located external to the turbine casing and the turbine fuel, as methane, ingested into the turbine together with the inlet air. The combustor has following basic dimensions and characteristics.

| | |
|---|---|
| Air/methane feed gas flow | 17.4 kg/second |
| Analysis | Saturated with water at 24° C. at atmospheric pressure |
| | 1.6% methane (vol/vol dry basis) |
| | 98.4% air (vol/vol dry basis) |
| Air/methane inlet temperature | 400° C. |
| Combustion gas exit temperature | 850° C. |
| Combustor internal diameter | 1,190 mm |
| Tube bundle: | |
| No of tubes | 1,794 |
| Tube outside diameter (spaced on triangular pitch) | 19 mm |
| Tube length | 2,000 mm |
| No of baffles | 5 |
| Top of tubes to top of combustor | 1,000 mm |

The tubes are 2 mm thick Sandvik 253-MA alloy serrated on the inside by a BSW "fine" tap die and electro-coated with nickel. The tubesheet 4 and baffles 10 are also of Sandvik 253-MA alloy. The external (high temperature) sure of the tubes can be coated with a ceramic oxide such as Mullite.

A combustor such as described above also has application in gas turbines, refinery furnaces and other forms of process furnaces.

In a yet further embodiment, the tubes 6 can have installed within them rods of porous ceramic which may be impregnated by known means by known catalysts such as nickel for methane-containing fuels, or known zinc oxide based catalysts for carbon monoxide-containing fuels.

A further embodiment of this invention, applied to the use of methane-contaminated coal mine ventilation air and mine drainage gas, now will be described with reference to FIG. 4, that shows a generalized gas turbine 100. The compression stage 102 of the gas turbine is coupled to an expansion stage 104 by a drive shaft 108. In turn, the expansion stage 104 is coupled to an electrical generator 106 by a further drive shaft 110. The electrical output of the generator 106 is power recovered from the mine ventilation air and drainage gas can be supplied to an electricity grid, thus representing a saleable commodity.

Methane-contaminated mine ventilation air passes by an inlet duct 250 to a mixing device 112 (as presently will be described), further into which a controlled amount of mine drainage gas, supplied by a further inlet duct 252, is added. The mixture then passes via an outlet duct 254 by the induced suction of the gas turbine compressor 102.

Compressed air containing methane then leaves the compressor 102 via an outlet duct 256 and to pass to a recuperator 116, in which it is heated in a heat exchange manner, and passes via a duct 258 to a combustor 114. The combustor 114 is constructed in accordance with the teaching of FIGS. 1–3b, and for the purpose of this example, in accordance with particular specification of the proceeding Example. The hot (combusted) gases leaving the combustor 114 pass via a duct 262 to the expansion stage 104.

Exhaust gas from the expansion stage 104 leave via an outlet duct 264 to pass through the recuperator 116, and the cooled exhaust gases then leave the recuperator 116 via an outlet duct 266 to pass to the atmosphere.

A waste heat boiler can be fed with the cooled turbine exhaust gas leaving the recuperator 116 to generate steam for cooling turbine discs, bearings and other components normally cooled by air from the turbine's compressor, thereby forcing or enabling all or substantially all of the methane (fuel gas) contaminated air ingested into the turbine to be passed through the combustion system.

Start-up fuel for the turbine, in this case distillate fuel, is fed to the combustor 114 via a pipeline 260 with air for the burner that is fed via a further pipeline 268.

Multiple turbines will be utilized for most applications, and operate at close to their rated capacity. Major variations in load can be made by shutting-down individual turbines, and some variation of the target turbine load can be made by varying the temperature set for the gas exiting the combustor 114 in the outlet duct 262. Load variation also can be made by variation of the mass flow rate of fuel through the turbine by known means, such as by use of variable inlet vanes incorporated in the compressor stage 102 and expansion stage.

Figure 4:
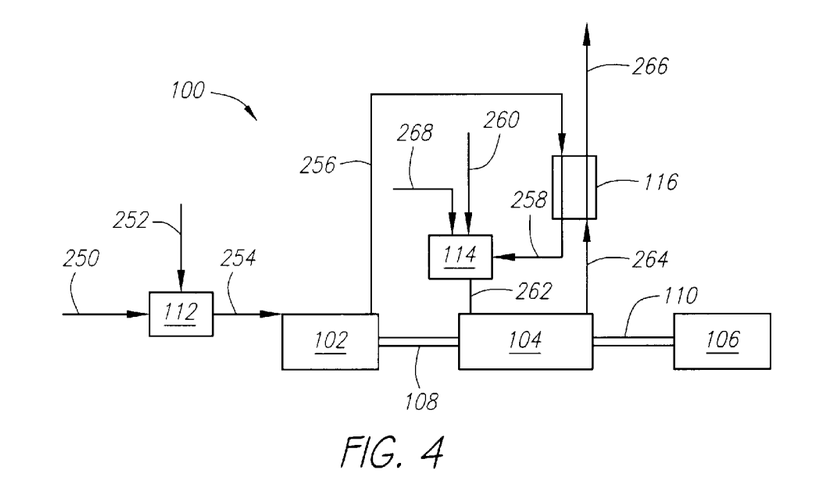
FIG. 4 is a schematic diagram of apparatus for the utilization of mine drainage and ventilation gases in generating electricity.

In a further preferred version of this invention, the gas turbine 100 shown in FIG. 4 has substantially all of its fuel requirements supplied by methane in the inlet air and by a controlled injection of the fuel gas into the suction stream of the compressor 102.

Turbines such as the Westinghouse CW191PG and the Solar Centaur 400R, both of which are currently not in production, and the General Electric Frame-1, Frame-2 and Frame-5 turbines which are regarded as old and dated designs, are ideally suited to be used in embodiments of the invention.

The turbine models listed, when modified to include the combustor 114 described, would be inoperable with methane in the ingested air in excess of 2.0% by volume, which is significantly below the lower explosive limit for methane in air. Where the turbine is used to ingest mine ventilation air, the turbine itself becomes an effective monitoring device paralleling, and independent of, any regulatory analytical instruments or other mine safety devices.

Figure 6A:
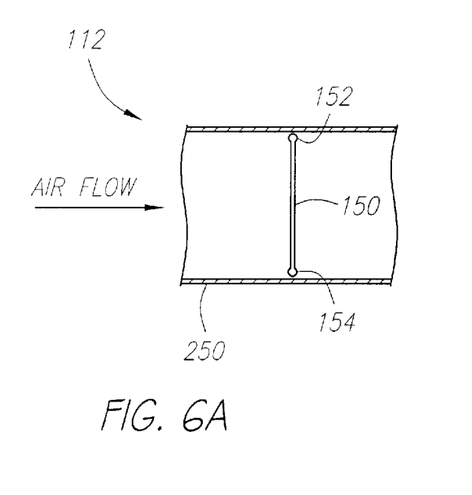
FIGS. 6a and 6b show detail of the gas mixing device.
Figure 6B:
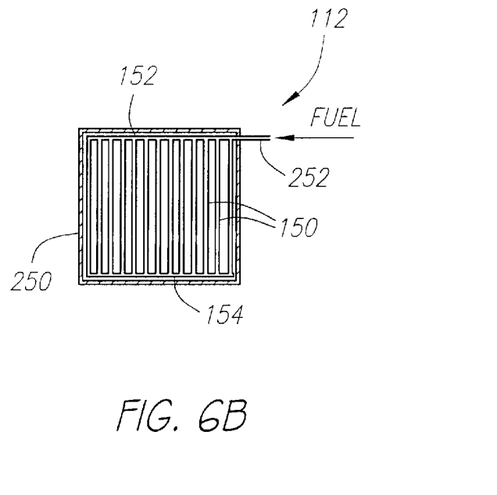
Figure 7:
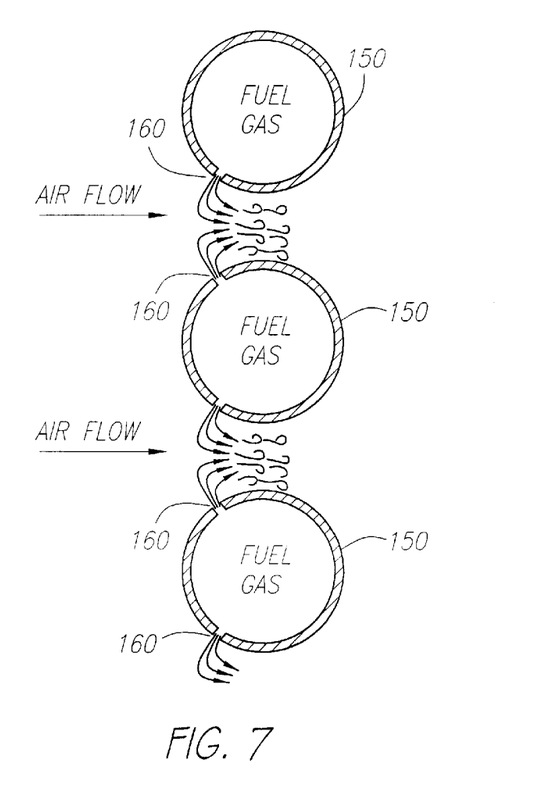
FIG. 7 shows details of the gas mixing zone in the gas mixing device.

FIG. 6a and 6b show details of a duct structure where the inlet mine ventilation air and mine drainage gas are mixed in the mixing device 112. FIG. 6a is a cross-sectional view along line A—A as shown in FIG. 6b. The duct 250 includes a plurality of spaced-apart vertically arranged hollow tubes 150 that are interconnected by a top and bottom conning pipes 152, 154. The top pipe 152 receives the supply of mine drainage gas from inlet duct 252 to be fed down the vertical tubes 150. As best can be seen from FIG. 7, each of the vertical tubes 150 has an away of small holes 160 in the perimeter, from which the drainage fuel gas exits to be mixed with the mine ventilation air. The space between adjacent tubes acts as a form of venturi mixer, with the gas and air velocities at the point of fuel gas injection being such as to prevent any stable flame operation in the unlikely event of a source of ignition being present.

EXAMPLE

Figure 5:
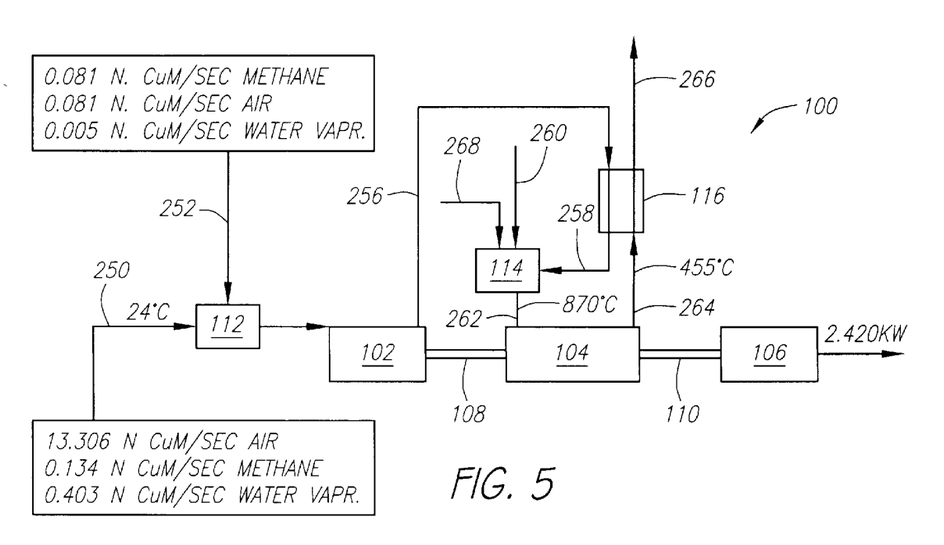
FIG. 5 is the same apparatus of FIG. 4, indicating operational parameters.

The embodiment shown in FIG. 5 is based on use of a Solar Centaur 3000R turbine unit. In this example, turbine speed control is achieved by control of power drawn from the generator 106 and the rate of gas fed to the turbine system via the inlet pipeline 252 to control gas input to maintain a pre-set temperature range for the combustor outlet temperature the outlet duct 262. The flow rate of the component parts of the mine ventilation are 13.306 N.m$^3$/s of air, 0.134 N.m$^3$/s of methane and 0.403 N.m$^3$/s of water vapour. The flow rate of the component parts of the mine drainage gas are 0.081 N.m$^3$/s of methane, 0.081 N.m$^3$/s of air and 0.005 N.m$^3$/s of water vapour. The unit N.m$^3$/s refers to "normal cubic meters per second", a well known unit of mass flow rate related to 0° C. and standard pressure. The compression stage has a compression ratio less than 14:1 and preferably less than 10:1. The concentration ratio of compressed fuel gas to air must be below the lower explosive level, and in this example is 1.6% (by volume), an preferably in the range 1.5% to 2%. The residence time within the combustor is sufficient to allow combustion of substantially all of the resident fuel as it passes through. The exit there of the gas products of combustion most preferably should be in the range 850–950° C., although the upper limit is 1,100° C. The resulting temperature of fuel gases output from the combustor 114 about 870° C., with the exhaust gas from the expansion stage 104 being 455° C. The electrical output from the generator 106 is 2,420 kW.

The rate of gas fed to the combustor 114 via the inlet pipeline 258 indicates the amount of methane in the ventilation air in the supply duct 250, and a suitable alarm of low gas flow or high combustion temperature would shut down the turbine and indicate abnormal and unsafe conditions in the mine ventilation system.

In a further embodiment, the gas turbine 100 can be used to combust carbon monoxide-containing steelworks gases by ingestion with air into the suction of the turbine. Part of the energy generated is used directly or indirectly to compress air for air separation for oxygen for steelworks-related operations and for air separation operations. There further can be fuel-free air provided for purging and cooling within the turbine, ensuring that substantially all of the fuel and air mixture ingested into the turbine passes to the turbine's combustion system.

In a further embodiment utilizing gas turbines, the air and fuel gas leaving the compressor may be contacted with water to saturate and further cool the air and fuel mixture, and the water may be waste water such as sewerage or site wastes and the like, which would be reduced in volume and have at least part of their odor producing components transferred to the combustion air for incineration in the combustion chamber.

I claim:

1. A combustor for the combustion of a fuel gas comprising a mixture of air and at least one combustible gas, wherein the concentration of air in the fuel gas is such that the fuel gas is below the lower flammability limit for the at least one combustible gas, the combustor comprising a vessel having an inlet for the supply of fuel gas, a combustion zone, an array of hollow tubes having one end open to the supplied fuel gas and the other end open to the combustion zone, the tubes being spaced-apart so that the outside of the tubes form an exit path for combusted gas from the combustion zone passing to an outlet from the vessel, a portion of the heat of the combusted gas being transferred through walls of the tubes to the fuel gas within the tubes to preheat the fuel gas before entering the combustion zone, wherein the end of the tubes open to the combustion zone are arranged so that the preheated fuel gas entering the combustion zone is mixed with the combusted gas to provide further heating of the preheated fuel gas within the combustion zone, and wherein the combustion zone is free of catalysts and has a volume sufficient to contain the preheated fuel gas for a time sufficient for flameless, non-catalytic combustion of the preheated fuel gas to occur.

2. A combustor as claimed in claim 1, further comprising baffle means between said tubes to form a tortuous said exit path.

3. A combustor as claimed in claim 2, wherein the tubes are arranged longitudinally of the vessel and said inlet and said outlet being proximate the same end of the vessel and the combustion zone being at the other end of the vessel.

4. A combustor as claimed in claim 2, wherein said tubes are arranged in an array by said baffle means formed of hexagonal shaped sleeves fitting over said tubes and interlocking adjacent sleeves.

5. A method for combusting fuel gases comprising the steps of:

preheating supplied fuel gas having a ratio with air that is less than the lower flammability limit for that fuel gas by heat given up by previously combusted said fuel gas;

containing said preheated fuel gas in a combustion area of a combustor for a time sufficient for flameless combustion to occur, said combustion area being free of catalysts so that the flameless combustion of said fuel gas within said combustion area occurs by flameless, non-catalytic combustion;

discharging said combusted fuel gas by a path that exchanges heat with said supplied fuel gas across a heat exchange surface.

6. A method as claimed in claim 5, comprising the further step of initially heating the combustion area to a temperature sufficient to cause combustion of said preheated fuel gas on its introduction to the combustion area.

7. A combustor for the spontaneous, self-combustion of a fuel gas comprising a mixture of air and at least one combustible gas, wherein the concentration of air in the fuel gas is such that the fuel gas is below the lower flammability limit for the at least one combustible gas, the combustor comprising:

a vessel having a fuel gas inlet, a combustion gas outlet, and a combustion zone; and an array of spaced-apart hollow tubes supported within the vessel, each of the tubes having a first end open to the fuel gas inlet and a second end open to the combustion zone, the spaces between the array of spaced-apart tubes defining an exit path for combusted gas between the combustion zone and the combustion gas outlet, and the walls of the tubes in the array of spaced-apart tubes defining a heat exchange surface for transferring heat from the combusted gas to the supplied fuel gas to preheat the supplied fuel gas before the supplied fuel gas enters the combustion zone;

wherein the combustion zone is free of catalysts and the combustion zone has a volume sufficient to contain the preheated fuel gas for a time sufficient for flameless, non-catalytic combustion of the preheated fuel gas to occur.

8. A combustor for the spontaneous, self-combustion of a fuel gas comprising a mixture of air and at least one combustible gas, wherein the concentration of air in the fuel gas is such that the fuel gas is below the lower flammability limit for the at least one combustible gas, the combustor comprising:

a vessel having a fuel gas inlet for the supply of fuel gas, a combustion gas outlet, and a combustion zone; and a heat exchanger disposed within the vessel, the heat exchanger comprising a fuel gas inlet path communicating the supplied fuel gas from the inlet to the combustion zone, a tortuous combusted gas exit path which communicates combusted gas from the combustion zone to the outlet, and a heat exchange surface communicating heat from the combusted gas in the exit path to the supplied fuel gas in the inlet path, wherein the heat exchange surface communicates heat from the combusted gas in the exit path to the supplied fuel gas in the inlet path to preheat the supplied fuel gas before the supplied fuel gas enters the combustion zone, and wherein the combustion zone is free of catalysts and has a volume sufficient to contain the preheated supplied fuel gas for a time sufficient for flameless, non-catalytic combustion of the preheated fuel gas to occur.

9. A combustor for the spontaneous, self-combustion of a fuel gas comprising a mixture of air and at least one combustible gas, wherein the concentration of air in the fuel gas is such that the fuel gas is below the lower flammability limit for the at least one combustible gas, the combustor comprising:

a vessel having a fuel gas inlet, a combustion gas outlet, and a combustion zone;

an array of spaced-apart hollow tubes supported within the vessel, each of the tubes having a first end open to the fuel gas inlet and a second end open to the combustion zone, the spaces between the array of spaced-apart tubes defining an exit path for combusted gas between the combustion zone and the combustion gas outlet, and the walls of the tubes in the array of spaced-apart tubes defining a heat exchange surface for transferring heat from the combusted gas to the supplied fuel gas to preheat the supplied fuel gas before the supplied fuel gas enters the combustion zone; and a burner located adjacent said combustion zone to provide preheating of said combustion zone to the combustion temperature before the fuel gas is introduced to the combustor;

wherein the combustion zone is free of catalysts and the combustion zone has a volume sufficient to contain the preheated fuel gas for a time sufficient for flameless, non-catalytic combustion of the preheated fuel gas to occur.

10. A combustor for the spontaneous, self-combustion of a fuel gas comprising a mixture of air and at least one combustible gas, wherein the concentration of air in the fuel gas is such that the fuel gas is below the lower flammability limit for the at least one combustible gas, the combustor comprising:

a vessel having a fuel gas inlet for the supply of fuel gas, a combustion gas outlet, and a combustion zone;

a heat exchanger disposed within the vessel, the heat exchanger comprising a fuel gas inlet path communicating the supplied fuel gas from the inlet to the combustion zone, a tortuous combusted gas exit path which communicates combusted gas from the combustion zone to the outlet, and a heat exchange surface communicating heat from the combusted gas in the exit path to the supplied fuel gas in the inlet path; and a burner located adjacent said combustion zone to provide preheating of said combustion zone to the combustion temperature before the fuel gas is introduced to the combustor;

wherein the heat exchange surface communicates heat from the combusted gas in the exit path to the supplied fuel gas in the inlet path to preheat the supplied fuel gas before the supplied fuel gas enters the combustion zone, and wherein the combustion zone is free of catalysts and has a volume sufficient to contain the preheated supplied fuel gas for a time sufficient for flameless, non-catalytic combustion of the preheated fuel gas to occur.

* * * * *

UNITED STATES PATENT AND TRADEMARK OFFICE
CERTIFICATE OF CORRECTION

PATENT NO.    : 6,033,207
DATED         : March 7, 2000
INVENTOR(S)   : Donald Ray Cummings Page 1 of 2

It is certified that error appears in the above-identified patent and that said Letters Patent is hereby corrected as shown below:

Column 1,
Line 12, change "lie" to read -- like --.
Line 44, change "utilised" to read -- utilized --.
Line 53, change "exaction" to read -- extraction --.
Line 64, change "modem" to read -- modern --.

Column 2,
Line 15, change "tat" to read -- that --.

Column 3,
Line 25, change "turbins" to read -- turbines --.
Line 26, change "content" to read -- contaminant --.

Column 4,
Line 6, change "flier" to read -- farther --.
Line 6, change "here" to read -- there --.

Column 5,
Line 11, change "level fed" to read -- level) is fed --.
Line 22, insert -- to -- between "combustion" and "occur".
Line 50, change "combustor 2 based" to read -- combustor 2' based --.

Column 6,
Line 25, change "sure" to read -- surfaces --.

Column 7,
Line 44, change "conning" to read -- connecting --.
Line 48, change "away" to read -- array --.
Line 63, change "temperature the" to read -- temperature in the --.

UNITED STATES PATENT AND TRADEMARK OFFICE
CERTIFICATE OF CORRECTION

PATENT NO. : 6,033,207
DATED : March 7, 2000
INVENTOR(S) : Donald Ray Cummings

It is certified that error appears in the above-identified patent and that said Letters Patent is hereby corrected as shown below:

Column 8,
Line 7, change "an" to read -- and --.
Line 11, change "there" to read -- temperature --.
Line 35, change "sewerage" to read -- sewage --.

Signed and Sealed this

Fourth Day of December, 2001

*Attest:*

*Attesting Officer*

NICHOLAS P. GODICI
*Acting Director of the United States Patent and Trademark Office*